Feb. 9, 1926.
A. BARTLEMAY
POWER TRANSMISSION MECHANISM
Filed Sept. 1, 1921
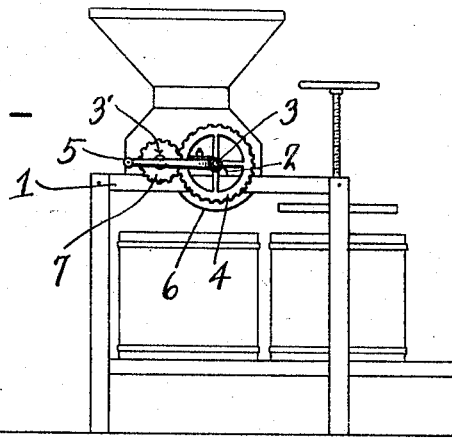
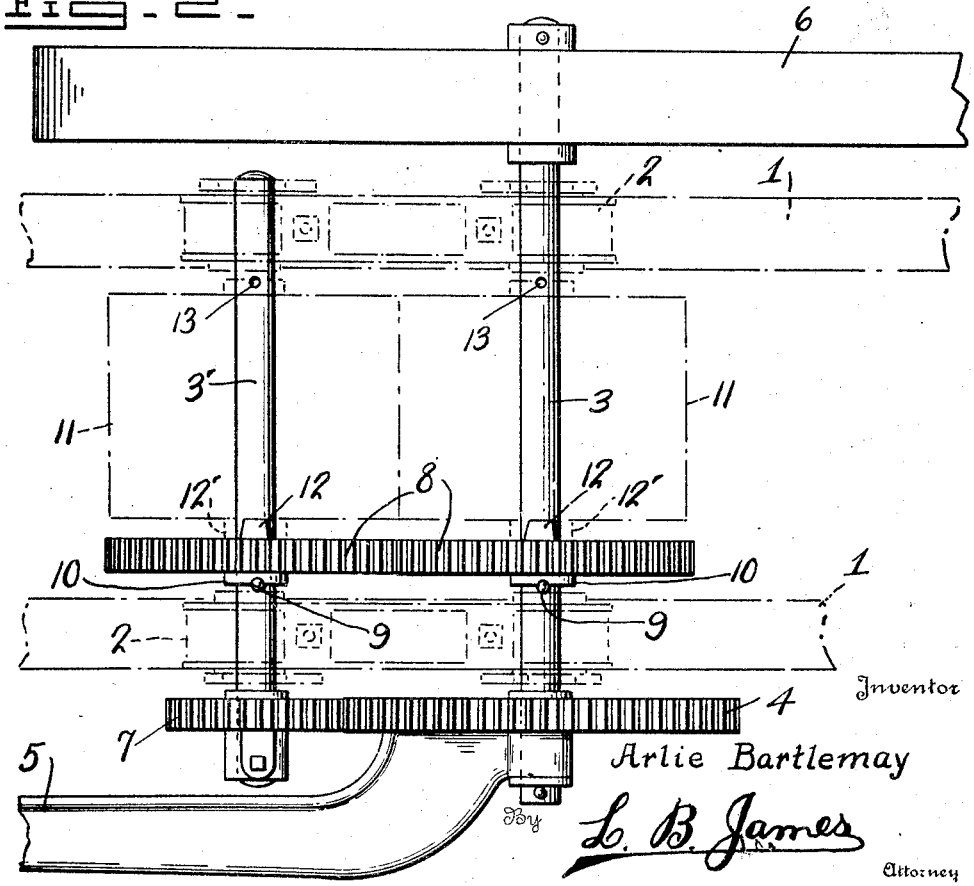

Patented Feb. 9, 1926.

1,572,264

UNITED STATES PATENT OFFICE.

ARLIE BARTLEMAY, OF BLUFFTON, INDIANA, ASSIGNOR TO THE RED CROSS MANUFACTURING CO., OF BLUFFTON, INDIANA.

POWER-TRANSMISSION MECHANISM.

Application filed September 1, 1921. Serial No. 497,684.

*To all whom it may concern:*

Be it known that I, ARLIE BARTLEMAY, a citizen of the United States, residing at Bluffton, in the county of Wells and State of Indiana, have invented certain new and useful Improvements in Power-Transmission Mechanisms, of which the following is a specification.

This invention relates to transmission means for transmitting the movement of a driving member to a member to be driven, the general object of the invention being to simplify the construction and arrangement of the parts and to reduce the number of the parts to a minimum, without decreasing the effectiveness of the assembly.

Another object of the invention is to so arrange the parts that certain adjustments may be made very easily and quickly so that a pair of driven members may be moved towards or away from each other, as desired.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation showing the invention in use upon a cider mill.

Figure 2 is an enlarged plan view of the invention.

While the drawings show the invention as forming part of a cider mill, such as that forming the subject matter of an application filed by me on Oct. 16, 1919, Serial No. 331,227 and allowed July 22, 1921, and patented Nov. 29, 1921, and numbered 1,398,252, I desire it to be understood that the invention is not to be limited to such use.

In these drawings, 1 indicates a frame upon which the bearings 2 are supported. In this instance the frame constitutes a part of a cider press, but, as before stated, the invention can be used in other situations. The parallel shafts 3 and 3' are supported in these bearings and pass through eccentric holes therein, as set forth in the above referred to application. These bearings are rotatably mounted in recesses in upper and lower supporting blocks which are bolted to the frame, as also described in said application. Shaft 3 has loosely mounted on one extremity thereof a gear 4, to the hub of which is secured a handle 5 and the other extremity has secured thereto a fly or balance wheel 6. The shaft 3' carries a pinion 7 at one extremity, which meshes with gear 4. The pinion and gear are arranged on the parts of the shafts which project beyond the frame and intermeshing gears 8 are secured to the shafts, intermediate their ends, and adjacent the inner side of one of the sills of the frame.

Thus shaft 3' will be driven by the rotation of the gear 4 by its handle and the rotation of this shaft will be communicated to the shaft 3 by the gears 8. All the gears are located on the two shafts and it is not necessary to provide a stub shaft for supporting the manually actuated gear.

The gears 8 are secured to the shafts by the pins 9 which pass through recesses formed in the collars 10 of the gears and through the shafts. The driven elements 11, shown as crushing rolls, are secured to the shafts by the projections 12 and 12' on the gears 8 and elements 11 and by the pins 13 engaging collars on the ends of the elements and passing through the shafts. Thus the elements will be caused to revolve with the shafts and the teeth of the gears are made elongated to permit adjustments of the parts by means of the eccentric bearings.

As will be apparent, the construction and arrangement of parts of the transmission means is extremely simple and compact and the number of parts small, so that the invention can be manufactured to sell at low cost and will last for a long time with rough usage. The loose gear at one end of the shaft 3 and the fly wheel at the other also make the device easy of operation.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination, a pair of spaced bearings arranged in parallelism, a pair of shafts each having apertures disposed to one side of its medial portion with certain ends thereof extending beyond the bearings, pins projecting through the apertures of the shafts, intermeshing gears disposed on the shafts, collars having aligned grooves engaging the pins from one side of the gears, lugs on the opposite sides of the gears in the region of the shafts, other intermeshing gears carried by the shafts on the opposite side of those bearings adjacent the first mentioned gears, a balance wheel secured at the extremity of one of the shafts exteriorly of the adjacent bearing, and means including other pins fixed to the shafts for retaining the first mentioned gears against the adjacent pins thereof.

In testimony whereof I affix my signature.

ARLIE BARTLEMAY.